(12) United States Patent
Fenollosa Esteve (10) Patent No.: US 9,090,030 B2
(45) Date of Patent: Jul. 28, 2015

(54) PROCEDURE FOR MANUFACTURING PIECES FOR THE FORMATION OF A REMOVABLE FLOOR COVERING

(75) Inventor: Jose Luis Fenollosa Esteve, Castellon (ES)

(73) Assignee: Butech Building Technology, S.A., Villarreal, Casetellon (ES)

( * ) Notice: Subject to any disclaimer, the term of this patent is extended or adjusted under 35 U.S.C. 154(b) by 0 days.

(21) Appl. No.: 13/814,496

(22) PCT Filed: Aug. 5, 2010

(86) PCT No.: PCT/ES2010/070541
§ 371 (c)(1),
(2), (4) Date: Feb. 5, 2013

(87) PCT Pub. No.: WO2012/017098
PCT Pub. Date: Feb. 9, 2012

(65) Prior Publication Data
US 2013/0160397 A1    Jun. 27, 2013

(51) Int. Cl.
*E04F 15/02* (2006.01)
*B29C 70/78* (2006.01)
*B29L 31/00* (2006.01)

(52) U.S. Cl.
CPC ............... *B29C 70/78* (2013.01); *E04F 15/02* (2013.01); *B29L 2031/732* (2013.01)

(58) Field of Classification Search
CPC .... B29C 70/78; E04F 15/02; B29L 2031/732
USPC ........... 52/177, 179, 180, 181, 384, 385, 386, 52/387, 403.1, 582.1, 797.1
See application file for complete search history.

(56) References Cited

U.S. PATENT DOCUMENTS

| | | | | |
|---|---|---|---|---|
| 4,133,481 A | * | 1/1979 | Bennett | 238/14 |
| 4,287,693 A | * | 9/1981 | Collette | 52/177 |
| 4,361,614 A | * | 11/1982 | Moffitt, Jr. | 428/138 |
| 4,497,858 A | * | 2/1985 | Dupont et al. | 428/44 |
| 5,333,423 A | * | 8/1994 | Propst | 52/126.6 |
| 5,362,544 A | * | 11/1994 | Reuben | 428/82 |
| 5,386,670 A | * | 2/1995 | Takeda et al. | 52/126.6 |
| 5,992,106 A | * | 11/1999 | Carling et al. | 52/177 |

(Continued)

FOREIGN PATENT DOCUMENTS

| | | | |
|---|---|---|---|
| DE | 102010005068 A1 | * | 7/2011 |
| DE | 102012206171 A1 | * | 9/2013 |

(Continued)

OTHER PUBLICATIONS

International Search Report for PCT/ES2010/070541 mailed Aug. 8, 2011 (3 pgs.).

(Continued)

*Primary Examiner* — Rodney Mintz
(74) *Attorney, Agent, or Firm* — Merchant & Gould P.C.

(57) ABSTRACT

Procedure for the manufacturing of pieces for the formation of a removable floor covering and the covering obtained includes obtaining by molding a joint made of a polymer material (1) that is mounted on the contour of a resistant plate (4). On the back of the plate is molded, inside a mold, and by an elastomer material, a layer (15) of shock-absorbing material provided with nerves (16) and conformations (18) on its free surface for the coupling of the intermediate joining elements between the covering pieces.

5 Claims, 10 Drawing Sheets

(56) References Cited

U.S. PATENT DOCUMENTS

| | | | |
|---|---|---|---|
| 6,098,354 A * | 8/2000 | Skandis | 52/177 |
| 6,416,054 B1 * | 7/2002 | Alfassi | 273/157 R |
| 6,623,840 B2 * | 9/2003 | Hainbach | 428/172 |
| 6,694,689 B1 * | 2/2004 | Scott et al. | 52/392 |
| 6,862,855 B1 * | 3/2005 | Milum et al. | 52/384 |
| 7,096,632 B2 * | 8/2006 | Pacione | 52/506.05 |
| 7,197,855 B2 * | 4/2007 | Della Pepa | 52/460 |
| 7,383,663 B2 * | 6/2008 | Pacione | 52/120 |
| 7,412,806 B2 * | 8/2008 | Pacione et al. | 52/506.05 |
| 7,571,573 B2 * | 8/2009 | Moller, Jr. | 52/177 |
| D603,640 S * | 11/2009 | Thrush | D6/582 |
| 7,610,731 B1 * | 11/2009 | Collison | 52/591.3 |
| 7,698,859 B2 * | 4/2010 | Sansano Marti | 52/177 |
| 7,757,449 B2 * | 7/2010 | Portoles Ibanez et al. | 52/384 |
| 7,779,602 B2 * | 8/2010 | Collison | 52/747.1 |
| 7,980,040 B2 * | 7/2011 | Pacione et al. | 52/584.1 |
| 7,987,645 B2 * | 8/2011 | Tinianov | 52/403.1 |
| 8,046,968 B2 * | 11/2011 | Kellner | 52/586.2 |
| 8,166,722 B2 * | 5/2012 | Moller, Jr. | 52/588.1 |
| 8,230,654 B2 * | 7/2012 | McIntosh et al. | 52/311.2 |
| 8,266,857 B2 * | 9/2012 | David | 52/385 |
| 8,535,785 B2 * | 9/2013 | Masanek et al. | 428/189 |
| 8,596,023 B2 * | 12/2013 | Jenkins et al. | 52/747.11 |
| 8,640,403 B2 * | 2/2014 | Masanek et al. | 52/177 |
| 8,656,662 B2 * | 2/2014 | Moller et al. | 52/181 |
| 8,713,863 B2 * | 5/2014 | Moller et al. | 52/181 |
| 8,726,602 B2 * | 5/2014 | DeLong | 52/589.1 |
| 8,782,990 B2 * | 7/2014 | Tang | 52/589.1 |
| 8,806,822 B1 * | 8/2014 | Wang | 52/311.2 |
| 8,833,007 B2 * | 9/2014 | Tillery et al. | 52/177 |
| 8,881,482 B2 * | 11/2014 | Cerny et al. | 52/582.2 |
| 2004/0139679 A1 | 7/2004 | Della Pepa | |
| 2004/0226242 A1 * | 11/2004 | Moller, Jr. | 52/384 |
| 2004/0258869 A1 * | 12/2004 | Walker | 428/44 |
| 2005/0016097 A1 * | 1/2005 | Janesky | 52/384 |
| 2005/0034395 A1 * | 2/2005 | Kotler | 52/384 |
| 2005/0034403 A1 * | 2/2005 | Chen | 52/578 |
| 2005/0103568 A1 * | 5/2005 | Sapoval et al. | 181/293 |
| 2005/0144867 A1 * | 7/2005 | Clarke | 52/389 |
| 2005/0158517 A1 * | 7/2005 | Rives et al. | 428/158 |
| 2006/0162269 A1 * | 7/2006 | Pacione et al. | 52/403.1 |
| 2006/0230701 A1 | 10/2006 | Pepa | |
| 2007/0039267 A1 * | 2/2007 | Swanson | 52/391 |
| 2008/0173569 A1 * | 7/2008 | Forsyth | 206/725 |
| 2008/0222983 A1 * | 9/2008 | Lalonde | 52/311.2 |
| 2008/0236097 A1 * | 10/2008 | Tinianov | 52/787.11 |
| 2008/0250744 A1 * | 10/2008 | Hrovath et al. | 52/582.1 |
| 2009/0313915 A1 * | 12/2009 | Kellner | 52/105 |
| 2010/0269441 A1 | 10/2010 | Fenollosa Esteve | |
| 2010/0313509 A1 * | 12/2010 | McIntosh et al. | 52/385 |
| 2012/0040135 A1 * | 2/2012 | Werthen et al. | 428/138 |
| 2012/0260595 A1 * | 10/2012 | McIntosh et al. | 52/387 |
| 2013/0139463 A1 * | 6/2013 | DeLong | 52/588.1 |
| 2013/0139464 A1 * | 6/2013 | DeLong et al. | 52/588.1 |
| 2014/0144092 A1 * | 5/2014 | Benz | 52/384 |
| 2014/0230353 A1 * | 8/2014 | Wang | 52/403.1 |

FOREIGN PATENT DOCUMENTS

| | | |
|---|---|---|
| EP | 2345776 A1 * | 7/2011 |
| EP | 2602096 B1 * | 11/2013 |
| ES | 2 357 124 B1 | 3/2012 |
| WO | WO 03/040491 | 5/2003 |
| WO | WO 2007/039593 | 4/2007 |
| WO | WO 2010023252 A2 * | 3/2010 |

OTHER PUBLICATIONS

International Preliminary Report on Patentability for PCT/ES2010/070541 mailed Oct. 2012 (7 pgs.).

* cited by examiner

FIG. 13

PROCEDURE FOR MANUFACTURING PIECES FOR THE FORMATION OF A REMOVABLE FLOOR COVERING

This application is a National Stage Application of PCT/ES2010/070541, filed 5 Aug. 2010, which application is incorporated herein by reference. To the extent appropriate, a claim of priority is made to the above disclosed application.

FIELD OF THE INVENTION

The present invention refers to a procedure for manufacturing pieces for the formation of a removable floor covering, and more specifically for manufacturing pieces consisting of a resistant upper plate, preferably made of ceramic material, and a lower shock-absorbing support layer, whose pieces rest directly on the surface to be covered and are joined by intermediate joining elements by simple mechanical coupling between said pieces and intermediate joining elements, with no need of any other joining materials or substances.

The object of the invention is also the removable floor covering formed with the piece obtained with the aforementioned manufacturing procedure.

BACKGROUND OF THE INVENTION

The pieces for the formation of a removable floor covering of the type indicated, in which the resistant upper plate and the shock-absorbing lower layer are joined by an intermediate adhesive, are well-known. This manufacturing process requires the separate formation of the shock-absorbing lower layer and its subsequent joining to the ceramic plate, by means of an adhesive, which makes the manufacturing cost of the covering pieces relatively high and slow.

A removable floor covering based on pieces obtained with the process discussed above is described for example in Spanish Patent Application No. ES20090030095 (filed on Apr. 24, 2009), which corresponds to US 2010/0269441 A1, filed by the same applicants. In this covering the shock-absorbing lower layer is fixed to the resistant plate by an adhesive and is provided with equal notches from its edges, having its outlet choked. As for the intermediate joining elements, their contour is equal to the double of the notch contour of the shock-absorbing layer and their thickness is equal to that of said layer.

With this constitution, the joining of the successive covering pieces is made by means of the intermediate joining elements, each one of which is housed in two facing notches of adjacent covering pieces.

Although the covering may be easily mounted and dismounted, it presents the problem of the high cost of the pieces that form it, due to the manufacturing process thereof, previously described.

Another problem of the aforementioned covering pieces is the risk of deterioration of the ceramic plate edges, due to accidental hits that they may endure during its transportation and mounting, hits which may cause the breaking of the free edges of the plate.

DESCRIPTION OF THE INVENTION

The object of the present invention is to eliminate the problems discussed above, by means of a process that allows the reduction of the manufacturing operations and the time necessary for obtaining the pieces for the formation of the covering, all of which will result in a considerable reduction in the manufacturing cost.

Another object of the invention is achieving some pieces for the formation of a floor covering, consisting of a resistant upper plate, preferably made of ceramic material, and a shock-absorbing lower layer, that is provided with means that allow obtaining a perfect adjustment between adjacent plates and that serves as protection means for the resistant upper plate, preventing the free edges thereof from suffering breaking and damage due to accidental hits.

A further object of the invention is to achieve a plate in which it is possible to form a completely level floor covering, even on surfaces that present certain irregularities or unevenness that may be absorbed between the covering pieces and the intermediate joining elements.

Another further object of the invention is to obtain covering pieces, with the previously described constitution, in which it is ensured a perfect joint between the upper plate and the lower layer with no separation risks between them.

The covering pieces of the invention are obtained from previously manufactured resistant plates, preferably ceramic.

From these ceramic plates and according to the procedure of the invention, the manufacturing of the covering pieces is carried out by means of the following stages:

a) Obtaining by means of molding and based on a polymer material, a joint with a uniform thickness and a contour coinciding with that of the ceramic plate;

b) Mounting, the previously obtained joint on the contour of the ceramic plate, which will serve as a peripheral airtight joint;

c) Placing the plate of ceramic material with the airtight joint into a mould with an equal contour and greater height, with the joint compressed between the internal wall of the mould and the edge of the plate of ceramic material;

d) Closing the mould by means of a closing plate that delimits a chamber with the back of the plate of ceramic material, said chamber being filled with a polymer material, based on a polymer in fluid state with a catalyst;

e) Heating the mould in order to accelerate the solidification process of the polymer material, up to its complete solidification;

f) Opening the mould and extracting the ceramic plate with the shock-absorbing lower layer formed and adhered to said ceramic piece.

As it has been previously indicated, the peripheral airtight joint will define a contour coincident with that of the ceramic plate, so that it is adjusted on said contour. Preferably this joint will be an L-shaped cross-section joint, with a first section having a height that is equal to the thickness of the ceramic plate, which will be intended for being tightly attached to the edge of said plate, and having a second section intended for being placed on the back of the ceramic plate. With this configuration the positioning of the joint during the formation process of the covering piece is ensured, being then the second section of the L-shaped cross-section inserted between the ceramic plate and the shock-absorbing layer of the polymer material. In order to achieve this end, the thickness of the second section of the airtight joint may be smaller than that of the first section.

The closing plate of the mould will present the surface that is directed towards the flat plate of ceramic material, parallel to said plate, but with grooves and recesses that will determine intermediate nerves and end conformations on the surface of the shock-absorbing layer, from the edge of the shock-absorbing layer, that will define the housings for the coupling of the intermediate joining elements of the covering pieces.

With the process of the invention, by means of a single operation a covering piece is obtained, with the shock-absorbing layer attached to the back of the ceramic plate, with no need of auxiliary joining operations or substances. At the same time the mounting and fixing of the peripheral joint is achieved and a lower surface that is free from the shock-absorbing layer, with nerves and projections that will define the contact points on the surface to be covered, is obtained, facilitating the setting of the covering pieces although the surface to be covered presents certain irregularities. In the same process, the conformations that will serve for the coupling of the intermediate joining elements of the covering pieces are also obtained.

By means of the process of the invention, pieces for the formation of a removable floor covering, with a polygonal contour, preferably square or rectangular, consisting of a resistant upper plate, preferably ceramic, and a shock-absorbing support lower layer are obtained. The joining of the covering pieces is carried out by means of intermediate joining elements. The independent pieces that will form the covering have a frame that peripherally surrounds the resistant upper plate fulfilling a threefold function. On the one hand, it serves as an airtight joint inside the mould that is filled with the polymer based on a polymer in melted state with a catalyst. On the other hand, the peripheral joint serves as a protection means for the edges and free edges of the ceramic plate, during handling and transportation of the pieces. Finally, the aforementioned frame serves as an adjusting means between the consecutive pieces, in the formation of the covering, as an airtight joint between said pieces and as a joint for absorbing possible dilatations of the ceramic plates.

The shock-absorbing lower layer of the covering pieces presents nerves on its free lower surface and protruding projections, which will determine support means for the pieces on the surface to be covered. The shock-absorbing lower layer will also present recesses running from the edge of said shock-absorbing layer that will determine mortises into which the intermediate joining elements will be partially coupled.

Preferably the recesses of the shock-absorbing lower layer will be made to coincide with the corners of said layer, delimiting a contour that is equal to that of the intermediate joining elements divided by the number of intermediate pieces that converge at a point. If the covering pieces have a square or rectangular contour, four pieces will converge with their corners at a point under which an intermediate joining element that will be coupled to the four recesses of the adjacent corners will be placed.

In this case each recess will have a contour that is equal to one fourth of the contour of the intermediate joining elements.

The intermediate joining elements may be cross-shaped, with the arms finished with laterally widened ends or may form a flat, circular or polygonal contour, crossed by intermediate arms that delimit through openings with said contour. The recesses of the shock-absorbing lower layer will form non-recessed channels and intermediate zones, the channels of which delimit a contour coincident with the corresponding part of the contour and intermediate arms of the intermediate joining element which is coupled in said recesses. As for the non-recessed intermediate zones, they will have a contour coincident with that of the through openings of the intermediate joining elements. In this way, it is achieved a secure coupling between the recesses of the lower layer, with their non-recessed channels and zones, with the contour, arms and openings of the intermediate joining pieces.

BRIEF DESCRIPTION OF THE DRAWINGS

In the attached drawings, it is represented in a schematic way a possible embodiment of the process for manufacturing the covering pieces of the invention, as well as the covering obtained with said pieces, being.

DETAILED DESCRIPTION OF AN EMBODIMENT

The features and advantages of the procedure of the invention, as well as the piece obtained with it, will be better understood with the following description, made in relation to an example represented in the attached drawings.

Figure 1:
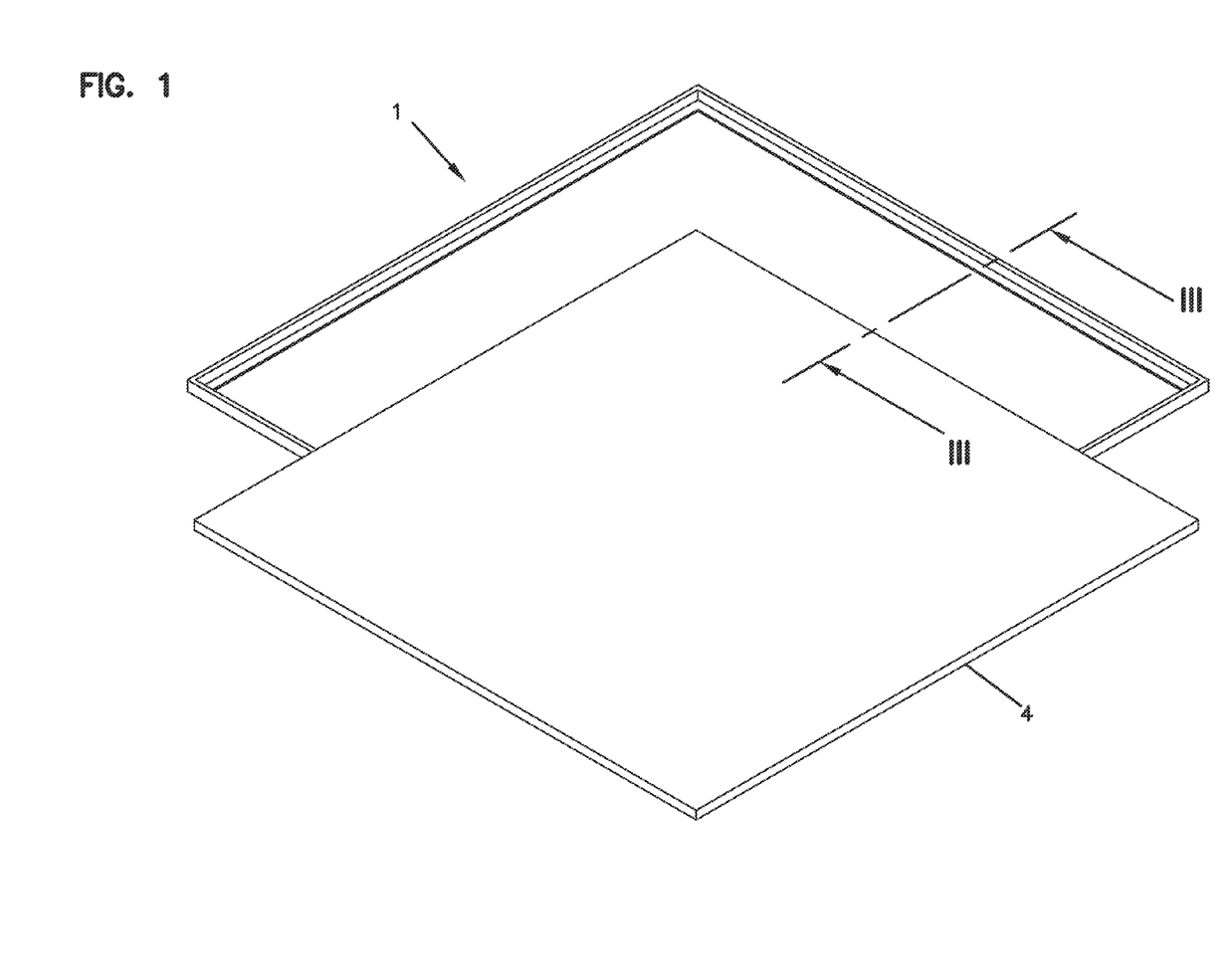
FIG. 1 is a perspective exploded view of a ceramic plate and an airtight joint which is mounted thereon.
Figure 2:
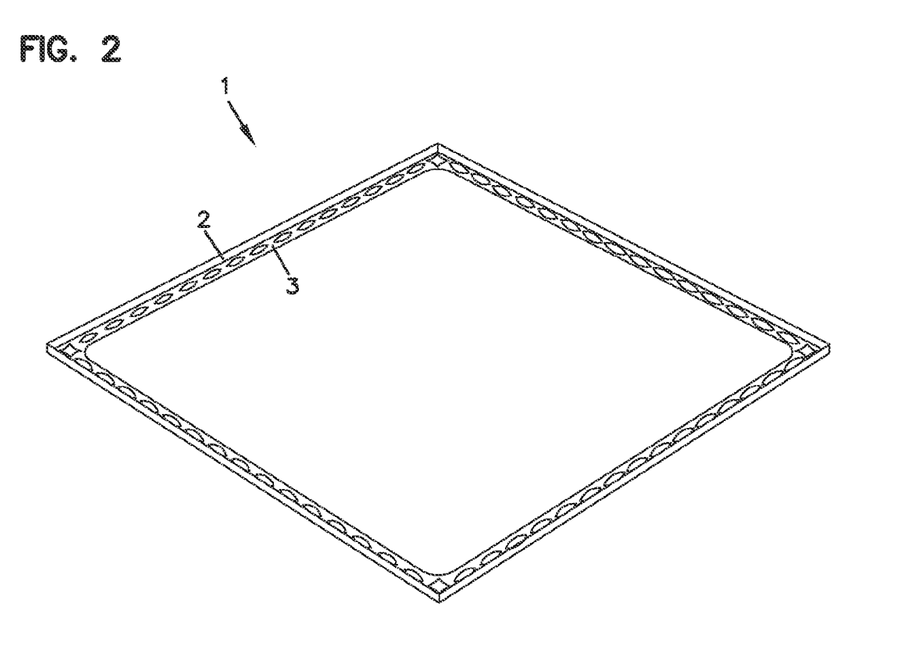
FIG. 2 is a perspective view of the airtight joint.
Figure 3:
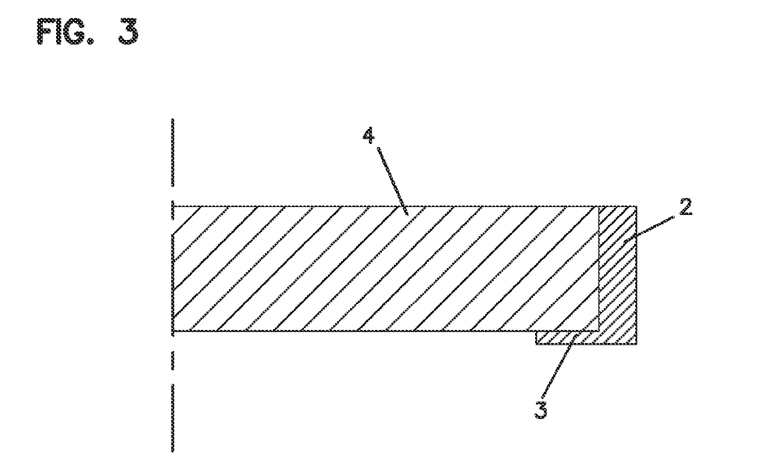
FIG. 3 is a partial sectional view of the ceramic plate having the airtight joint mounted thereon, taken according to the cutting line III-III of FIG. 1.

The procedure for the manufacturing of covering pieces begins by obtaining a joint or frame 1, based on a polymer material, represented in perspective in FIG. 2, which is an L-shaped section, having a first wall 2 and a second wall 3 perpendicular to each other. This joint or frame 1 is intended for being mounted on the contour of the resistant plate 4, FIG. 1, that will become part of the covering plate of the invention and that will be preferably ceramic. The first wall 2 of the joint 1 delimits a contour coincident with that of the resistant plate 4, being attached to the edge thereof, as it is shown in FIG. 3, while the second wall 3 of the peripheral joint 1 is attached to the back of the resistant plate 4.

The second wall 3 of the peripheral joint 1 may present openings that will be useful for reducing the material used in the formation of said joint. The wall 2 will have a uniform thickness and a height that is equal to the thickness of the resistant plate 4.

Figure 4:
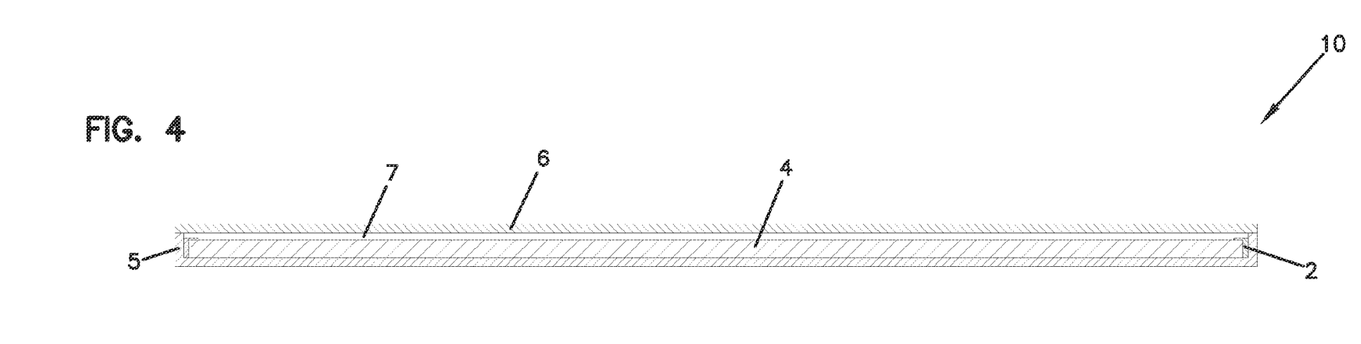
FIG. 4 is a cross-sectional view of a mould and the closing cover, inside of which it is shown a ceramic plate with the peripheral joint.
Figure 5:
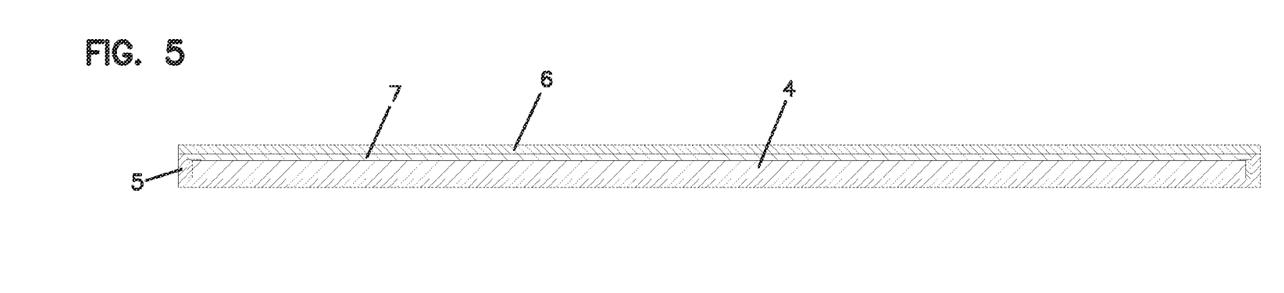
FIG. 5 is a sectional view similar to that of FIG. 4, showing the formation of the shock-absorbing material layer on the back of the ceramic plate.

Once the peripheral joint 1 is coupled on the resistant plate 4, this plate is placed in inverted position into the mould 5, FIG. 4, so that the wall 2 of the peripheral joint is partially compressed between the resistant plate 4 and the wall of the mould 5. The mould will have a greater height than the thickness of the resistant plate 4, so that when said mould is closed by means of a closing plate 6 a chamber 7 is delimited, which is intended to be filled with a polymer material 8, based on a polymer in fluid state with a catalyst. The mould is heated so that it will allow the acceleration of the solidification process of the polymer material 8, and once the solidification is achieved the mould is opened and the covering piece formed is extracted.

Figure 6:
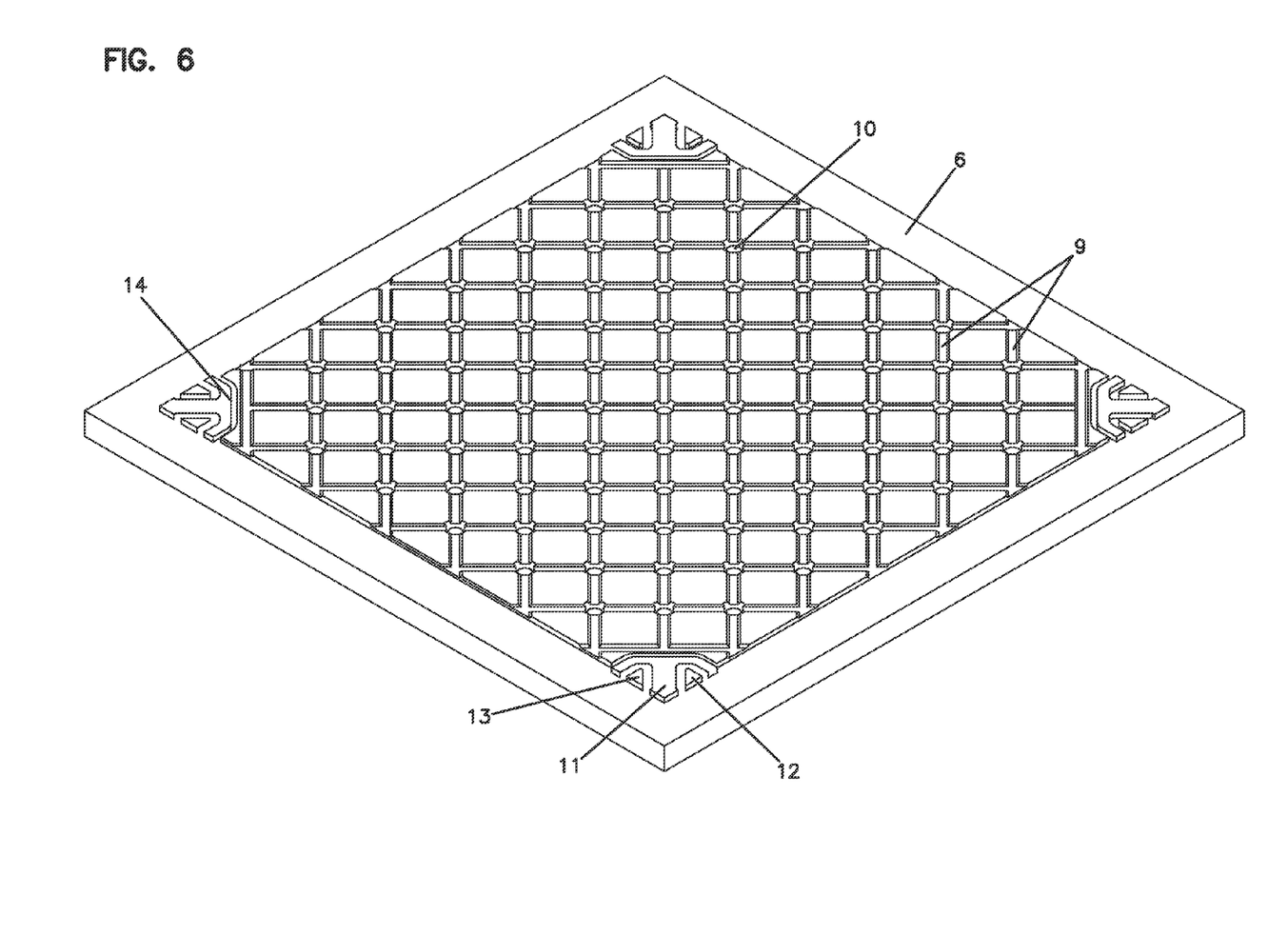
FIG. 6 is a lower perspective view of the closing plate of the mould of FIGS. 4 and 5, showing the surface directed towards the ceramic plate.

The closing plate 6 is shown in inverted position in FIG. 6. This plate presents a surface directed towards the ceramic plate 4 which is flat and it presents grooves 9 in the zone that will be limited by the walls of the mould 5, for example according to two series perpendicular to each other, and small recesses 10 that may be placed in coincidence with the intersection points of grooves 9. In the corners, it may have projecting zones 11 and 12 limited between grooves 13 and 14.

Figure 7:
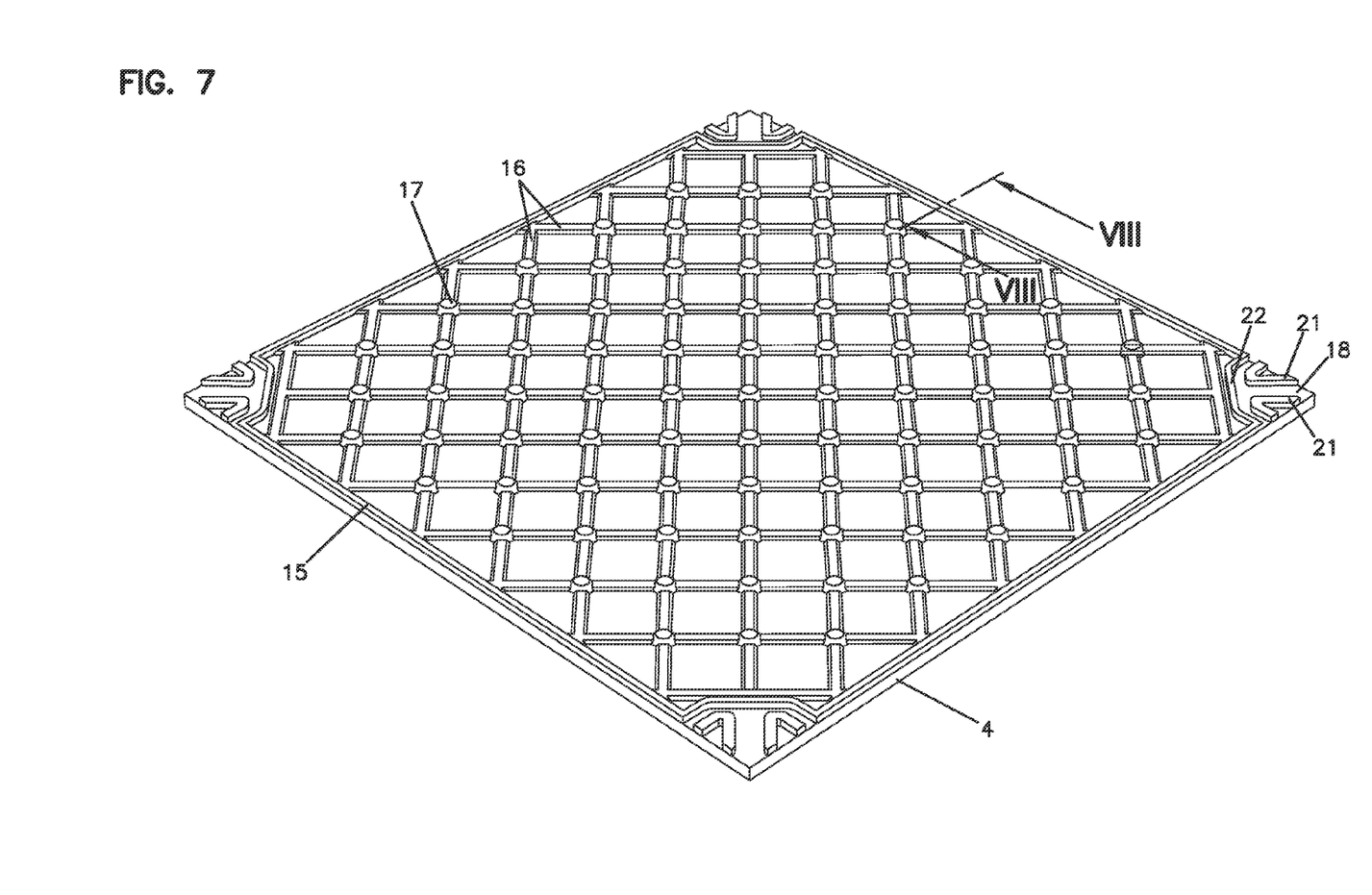
FIG. 7 is a lower perspective view of the covering piece obtained with the mould of FIGS. 4 and 5.
Figure 8:
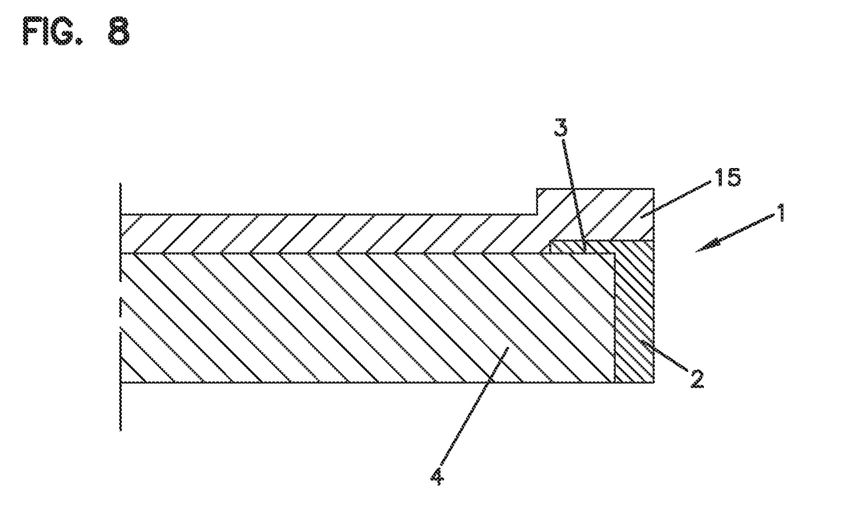
FIG. 8 is a partial sectional view of a covering piece taken according to the cutting line VIII-VIII of FIG. 7.

The covering piece obtained with the described process consists of, as it is represented in FIG. 7, a plate 4 of resistant material, preferably ceramic, and a shock-absorbing layer 15, that corresponds to the filling polymer material 8 inserted in the mould 5. This shock-absorbing layer 15 presents on its visible surface nerves 16 and projections 17, which correspond to the grooves 9 and the recesses 10, FIG. 6, of the closing plate 6 of the mould. Also, in the corners it will have some recessed zones 18 whose contour corresponds to one fourth of the contour of the intermediate joining elements 19, FIGS. 9 and 10, used in the covering formation.

Figure 9:
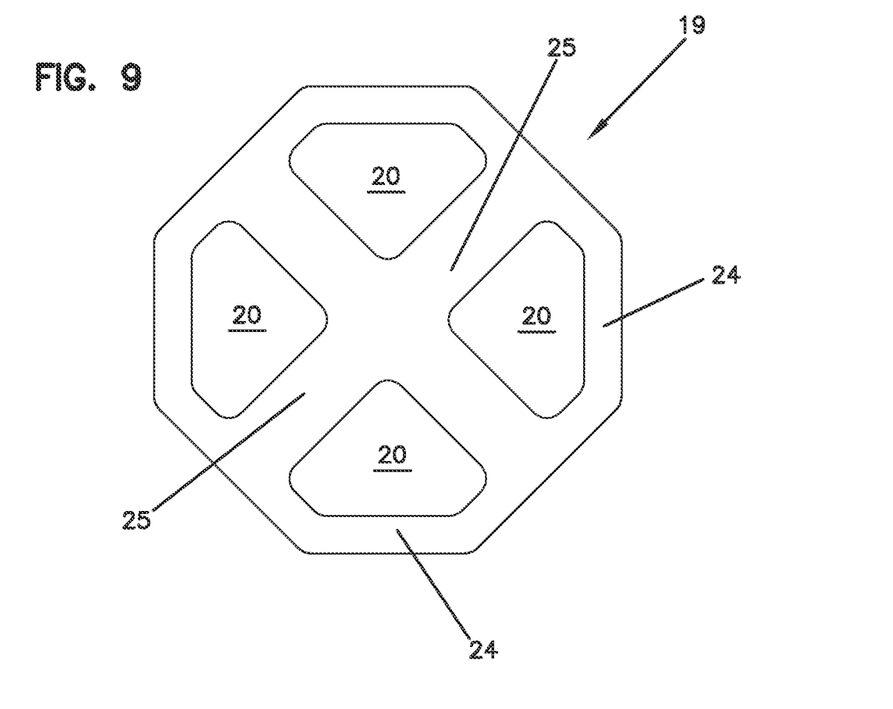
FIGS. 9 and 10 are, respectively, an upper plan view and a lateral elevated view of one of the intermediate joining pieces.
Figure 10:
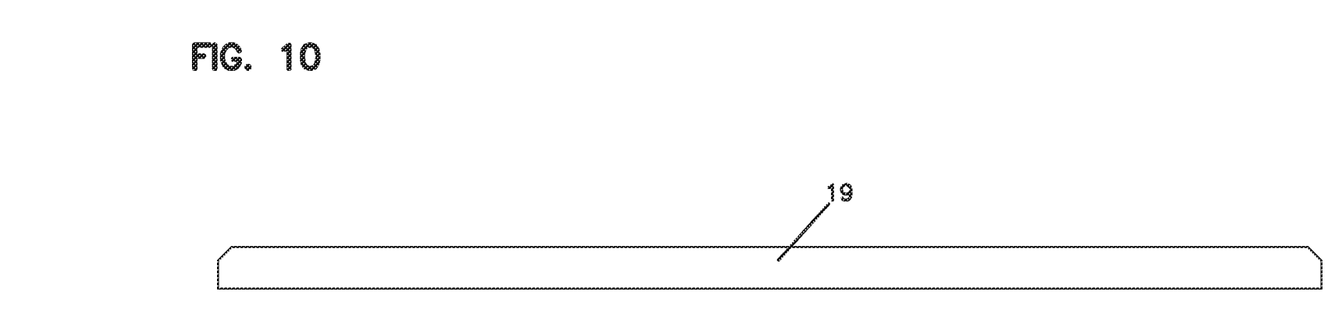

In the example represented in the drawings the intermediate joining elements 19 have an octagonal contour and four intermediate openings 20, each one of which corresponds, in its contour and dimension, to the double of the contour of one of the angular nerves 21 that limit the conformations 18.

Figure 11:
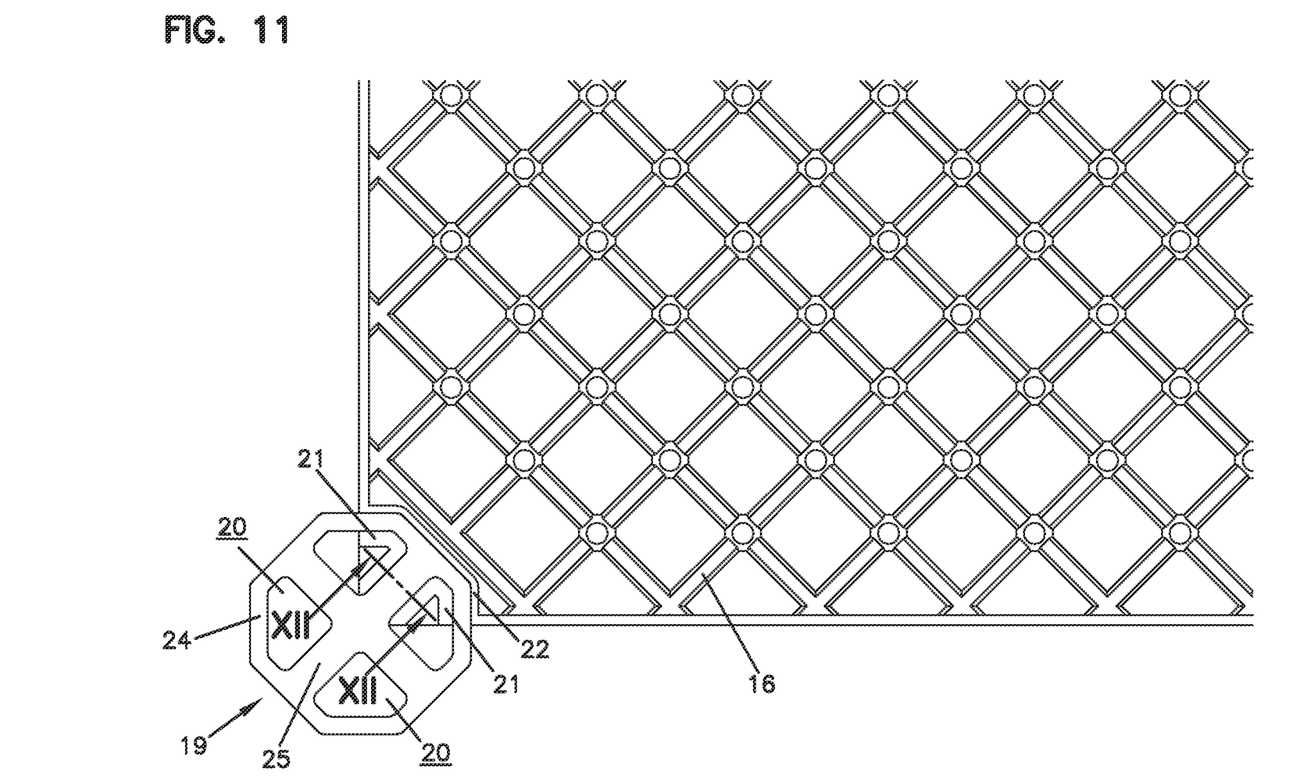
FIG. 11 is a partial lower plan view of a covering piece with an intermediate joining element coupled thereon.

With this constitution, the intermediate joining elements 19 are coupled on the conformations defined by the recesses 18 as shown in FIG. 11, being the two nerves 21 of each corner housed in the consecutive openings 20 of the intermediate joining element 19, which in turn is coupled between the nerves 21 and the nerve 22 which was obtained by means of channel 14, FIG. 6, of the closing plate of the mould.

Figure 13:
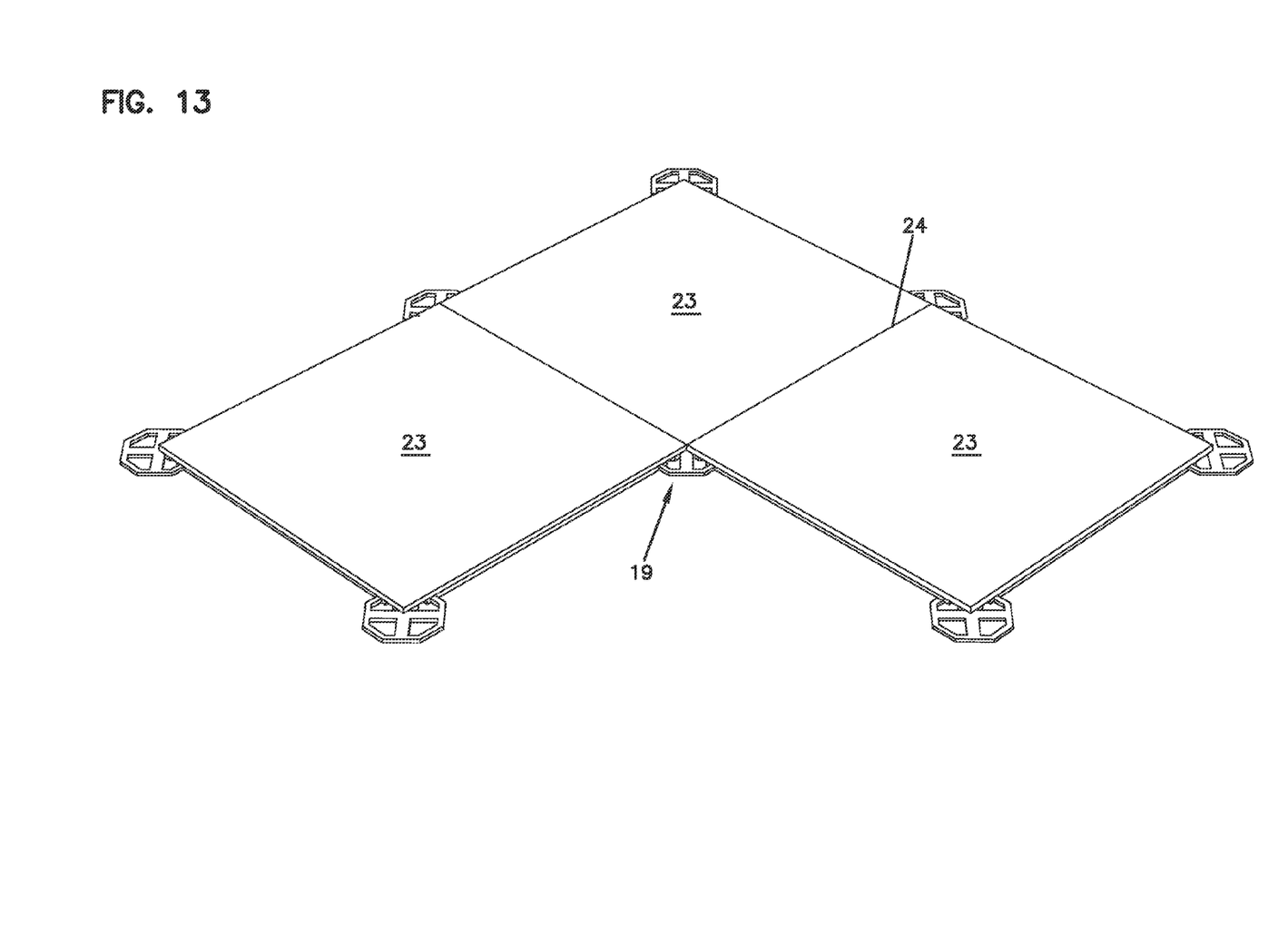
FIG. 13 is a partial perspective view of a covering formed with the covering piece of the invention.

Each intermediate joining element 19 will be useful for coupling four covering pieces 23, FIG. 13, as the fourth part of the intermediate joining element 19 is housed in each corner of the four pieces 23 that converge at a point.

For the formation of the covering, the pieces 23 will be placed in inverted position on the intermediate joining elements 19, downwardly pressing on them until achieving a perfect coupling of the intermediate joining elements in the conformations of the shock-absorbing layer 15 defined by the recesses or cuts 18, FIG. 11.

Figure 12:
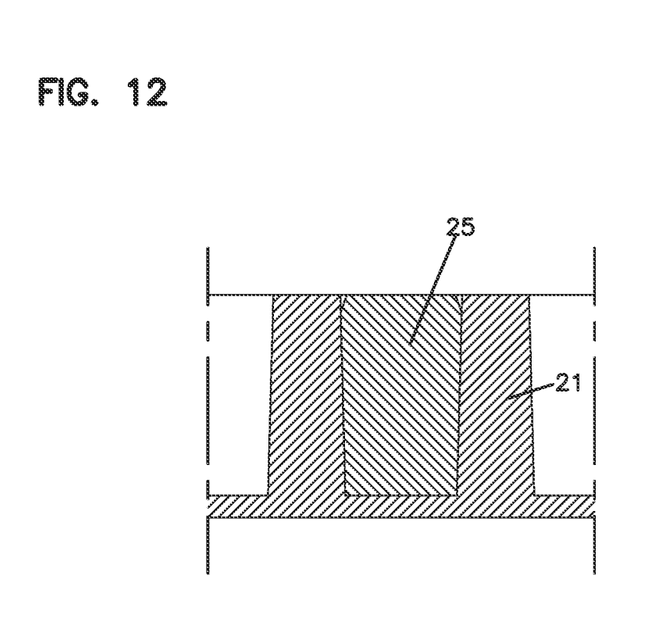
FIG. 12 is a partial sectional view of a covering piece and an intermediate joining element coupled thereon, taken according to the cutting line XII-XII of FIG. 11.

In order to facilitate this coupling as it is shown in FIG. 12, the channel, recess or conformation 18 of the corners of the shock-absorbing layer 15 may be limited by slightly divergent walls towards the outlet, for example with a 1.5 degree angle, being the sections 24 of the contour as tapered as the intermediate arms 25 that delimit the openings 20 in the intermediate joining elements 19, FIGS. 9 and 10.

When forming the covering, FIG. 13, the consecutive pieces 23, are separated by a nerve 24 that corresponds to the first two walls 2, FIGS. 1 and 2, of the joint 1 that surrounds each ceramic plate. This joint will also serve as a protection element for the ceramic plate, during its transportation and handling.

The polymer material that fills the chamber 7 delimited in the mould between the resistant plate 4 and the closing plate 6 may be supplied to said chamber by any pouring system, by means of injection, etc.

The intermediate joining elements 19 may present any other contour, with intermediate openings 20 that will receive projecting portions of the shock-absorbing layer 15 of said pieces, which in turn will present conformations 18 that will receive sections 24 of the contour and intermediate arms 25, as stated in relation to FIGS. 7 and 11. The intermediate joining elements 19 may also be cross-shaped, with the arms finishing in laterally widened ends, presenting the conformations 18 the corresponding contour for mutual coupling.

In the formation of a covering, intermediate joining elements of varied thickness may be used, so as to absorb any possible unevenness on the surface to be covered.

On the other hand, the nerves 16 and projections 17, FIG. 7, will delimit the support means for the covering pieces 23, between which any possible irregularity of the surface to be covered may be absorbed.

With the procedure of the invention, covering pieces are achieved, in which the shock-absorbing layer 15 is formed on the same resistant plate 4, with the peripheral joint 1 already mounted, all of which simplifies and reduces the manufacturing process.

On the other hand, the covering formed with the plates of the invention may be mounted and dismounted with great ease, without needing work or generating waste, all of which allows the reduction of installation costs and the recovering of the pavement, for its later use.

The invention claimed is:

1. A removable floor covering, comprising:
   independent pieces, each of the pieces having a regular polygonal contour and comprising:
      an upper resistant plate having a lower part and a peripheral edge;
   a shock-absorbing lower layer covering the lower part of the upper resistant plate and having, on a free lower surface, bridges and projections supporting the pieces on a surface to be covered;
   intermediate joining elements configured to join the pieces,
   wherein the shock-absorbing lower layer includes recesses extending from corners of the shock-absorbing lower layer and partially coupling the intermediate joining elements; and
   a frame configured to peripherally surround the upper resistant plate of each of the pieces, the frame having a first section extending vertically, and a second section extending horizontally and perpendicular to the first section to form an L-shaped cross-section;
   wherein the first section has a height that is equal to a thickness of the upper resistant plate and is attached to the peripheral edge of the upper resistant plate,
   wherein the second section is attached to the lower part of the upper resistant plate to cover a portion of the lower part of the upper resistant plate adjacent the peripheral edge of the upper resistant plate, and
   wherein the shock-absorbing lower layer extends onto the second section and the second section is between the upper resistant plate and the shock-absorbing lower layer; and wherein the shock-absorbing lower layer includes a projection extending downward from the free lower surface directly below the second section of the frame.

2. The floor covering according to claim 1, wherein the recesses of the shock-absorbing lower layer are made to coincide with the corners of the shock-absorbing lower layer and delimit a contour that is equal to that of the intermediate joining elements divided by the number of intermediate pieces that converge at a point.

3. The floor covering according to claim 1, wherein a thickness of the second section of the frame is smaller than a thickness of the first section of said frame.

4. The floor covering according to claim 1, wherein the intermediate joining elements form a flat contour, crossed by intermediate arms that delimit through openings with said contour; and wherein the recesses of the shock-absorbing lower layer form channels and intermediate zones, said channels delimiting a contour coincident with the corresponding part of the contour and intermediate arms of the intermediate joining element which are coupled to said recesses; and wherein intermediate zones have a contour coincident with that of the through openings of the joining elements.

5. The floor covering according to claim 4, wherein the channels of the recesses of the shock-absorbing lower layer and the contour and intermediate arms of the intermediate joining elements have a coincidental cross-section, growing in the channels towards outlets of the channels.

\* \* \* \* \*